March 24, 1936.  M. WAGNER  2,035,032
POWER DRIVEN VEHICLE
Filed Nov. 20, 1933
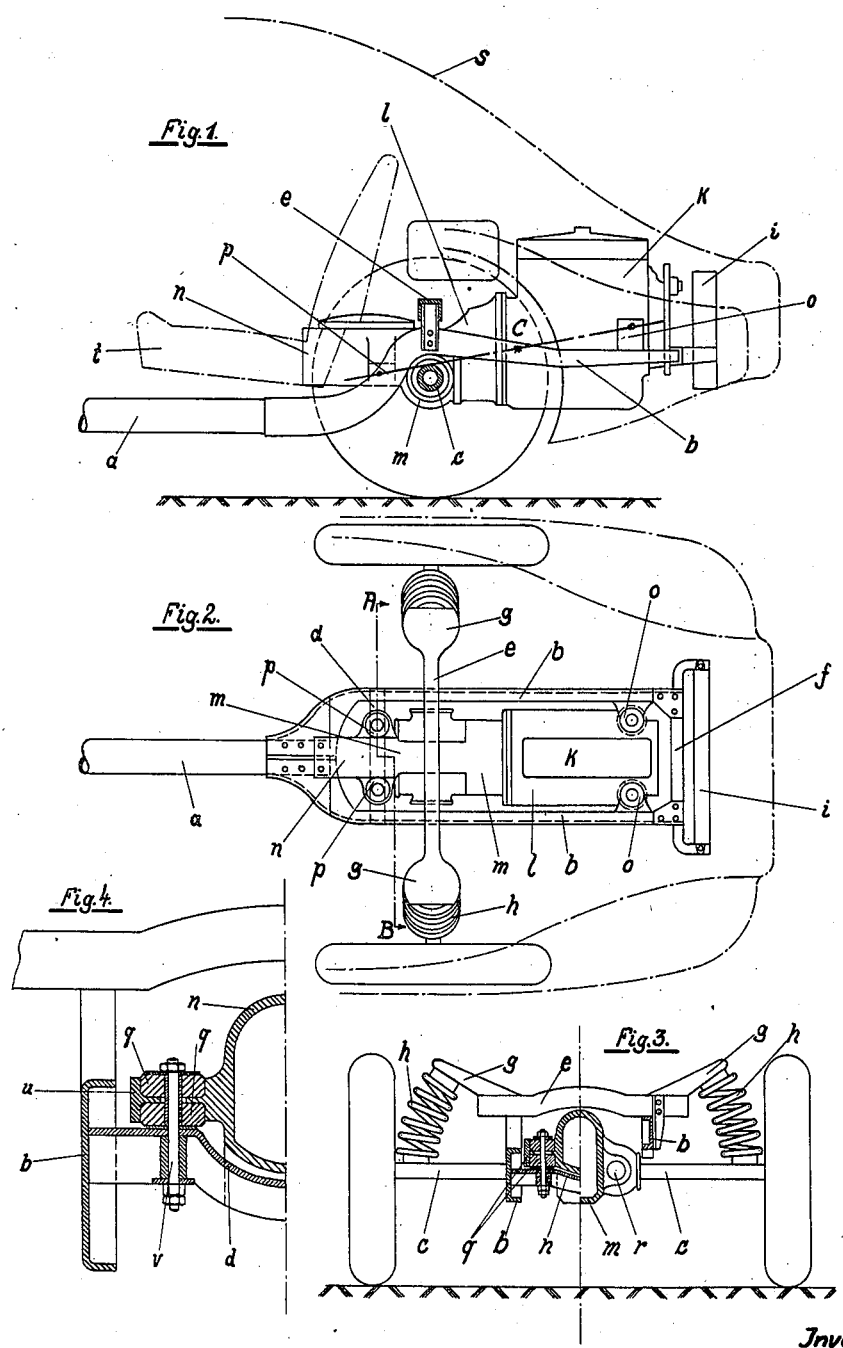
Inventor
Max Wagner Patented Mar. 24, 1936

2,035,032

UNITED STATES PATENT OFFICE 2,035,032

POWER DRIVEN VEHICLE

Max Wagner, Stuttgart, Germany, assignor to Daimler-Benz Aktiengesellschaft, Stuttgart-Unterturkheim, Germany, a company of Germany Application November 20, 1933, Serial No. 698,887
In Germany November 11, 1932

10 Claims. (Cl. 180—54)

This invention relates to a power-driven vehicle having a driving unit comprising engine and transmission mounted on the chassis or on the body, on which the axles, more particularly swinging axles carrying the driving wheels are directly pivoted or supported, and consists essentially in this that the casing block of the driving unit is resiliently connected with the chassis or the body by means of rubber buffers or the like.

By these means the advantage is obtained that the shocks arising from irregularities in the road and transmitted to the wheels and from the wheels to the driving unit are not transmitted undamped to the chassis or the body. This arrangement is especially advantageous when the swinging axles or the wheels are connected with the casing block in such a manner that they form a rigid system in the horizontal direction with the driving unit and the pushing and turning forces are transmitted in a non-resilient manner to the casing block. This is the case, for example, in an arrangement in which the swinging axles are connected with the casing block by joints which only allow the axles to swing in the transverse plane of the vehicle.

The invention gives the advantage that all shocks acting on the wheels are absorbed before being transmitted to the chassis, the vertical shocks by the springing and the horizontal shocks by the elastic suspension of the driving aggregate. This latter has also the advantage that the vibrations of the engine are not allowed to reach the frame. The springs serving for springing the wheels, for example, helical springs, may be supported against the chassis or against the driving aggregate.

Furthermore, the driving unit is arranged at the rear end of the engine and mounted on or between the prongs of a forked longitudinal central tube.

It has already been proposed in motor vehicles with tubular frame and engine arranged behind the rear axle to flange the engine or driving unit onto the rear end of the tubular frame so as to overhang. This, however, produced unfavourable stresses on the engine so that such a method of mounting was found unsatisfactory. It was also necessary to arrange other units, such as the radiator and so forth, on the engine itself in case it was not desired to provide separate additional frames therefor, the arrangement of which independently of the engine, however, caused difficulties. Also the whole axial pressure had to be taken up by the engine-transmission block so that the construction gave insufficient security on account of this load.

Proposals are also known for placing the engine on the end of a longitudinal central girder projecting beyond the rear axle. This, however, causes the construction to be very high which has great disadvantages on account of the high centre of gravity and with regard to the provision at the back of an advantageous streamlined coachwork for which the rearwardly disposed engine is known to be especially suitable. The use of a fork frame makes it possible to mount the engine between the ends of the fork and thereby avoid great height while the parts are sufficiently clear of the ground. At the same time the engine can be satisfactorily and safely mounted and the frame can also serve for receiving the other units and the springing forces.

Preferably the, for example, tubular longitudinal central girder will be placed as low as possible and the frame fork will be curved upwards over the rear axle so that the latter and the swinging axles pivoted to the engine transmission aggregate can move freely. Also the arrangement can be made such that the centre of gravity of the aggregate lies substantially in the plane of the frame and consequently substantially no turning moments and stresses in the frame are produced by transverse oscillations of the aggregate.

In the accompanying drawing a constructional example of the invention is illustrated.

Fig. 1 is a side elevation.

Fig. 2 a plan view of the rear end of a vehicle.

Fig. 3 is a section on the line A—B of Fig. 2, and

Fig. 4 shows on a larger scale the connection between the drive casing and the vehicle frame.

On the longitudinal central tube $a$ of the vehicle which replaces the frame, there is secured at the back a fork frame $b$ in one or more parts consisting, for example, of U-iron which is curved upwards over the rear swinging axles $c$ so that these can swing freely under the frame. The fork ends are mutually reinforced by transverse members $d$, $e$, and $f$, the member $e$ being arranged above the frame and extended beyond it. At the ends of the transverse member $e$ spring supports $g$ are secured which serve for supporting the unguided helical springs $h$. The transverse member $f$ secured to the outermost end of the fork is provided for receiving the radiator $i$. The radiator could obviously be arranged at any other desired place, for example in front of the engine, and the fuel tank, spare wheel or the like could be arranged behind the engine at the rear end of the vehicle.

The driving aggregate is combined in a casing unit and mounted on the fork between its ends. The aggregate consists in a known manner of the engine $k$, the fly-wheel-clutch casing $l$, the differential gear $m$ and change speed gear $n$, the differential being driven, for example, through a hollow shaft mounted on the engine-gear shaft, from the change speed gear. The aggregate is mounted, for example, at the rear of the engine at $o$ on bearing members of the frame and in front at the change speed gear at $p$ on the transverse member $d$ at two points on each case.

According to the invention this mounting is effected by means of rubber buffers $q$ which are inserted, for example, in recesses in the lugs $u$ of the casing and surround in a known manner bolts $v$ secured, for example, on to the transverse member $d$ in such a manner that there is no direct or indirect metallic connection between the casing block and the frame and elastic movability of these two parts with respect to one another in all directions is ensured. Shocks and vibrations are therefore effectively damped before being transmitted from the driving block to the frame. The aggregate could be mounted at three or at more than four points instead of at four points.

The axles $c$ are pivoted laterally to the differential casing by means of joints $r$ so that they can swing only in the direction perpendicular to the longitudinal axis of the vehicle but in the horizontal direction form with the casing block a rigid system. In this way the springing $h$ is freed from load due to the axial forces and these are taken up by the casing block. The springing may consequently fulfill its proper purpose of taking up the vertical shocks in the form of a frictionless helical springing without guides.

The joints $r$ of the swinging axles $c$ are preferably placed near to the planes fixed by the mounting points $p$ and $o$ so that the axial forces cannot produce any additional moments on the mounting. The centre of gravity $c$ of the driving aggregate is also placed as low as possible and, when the frame is also curved over the rear axle, is brought as near as possible to the mounting place so that no substantial lateral tilting moments which would produce torsional stresses in the frame can occur and a very steady position of the aggregate is obtained.

In the drawing, a vehicle having a streamlined coachwork $s$ is illustrated. For such coachwork the arrangement according to the present invention is particularly advantageous since the driving unit can be arranged in a satisfactory manner in the rear portion of the body behind the seat $t$.

What I claim is:

1. In a power-driven vehicle, a longitudinal central girder forming the frame situated substantially below the wheel axis and a forked portion at the rear end of the frame rising above said axis, a driving unit substantially above the wheel axis and comprising engine and transmission mounted between the prongs of the fork, wheels on each side of the driving unit, half axles on which the wheels are mounted, joints for pivotally attaching the half axles directly to the driving unit and allowing the wheels to swing only in a vertical transverse plane of the vehicle, transverse members between the prongs of the fork, at least one transverse member being extended laterally over the prongs towards the wheels and unguided helical springs which bear at one end against the top of the half axles and at the other end against the extended transverse members.

2. In a power driven vehicle, the combination of a central longitudinal girder member forming the frame and forked at one end, a driving unit, comprising an engine and transmission gearing mounted on said girder member between the prongs of the fork and swinging half axles pivoted directly on said driving unit, said swinging half axles having road wheels thereon, springing means for yieldingly connecting the half axles to the frame, elastic bearing means for securing the driving unit at its front to the forked portion of the frame and elastic bearing means for securing the driving unit at its rear end to the forked portion of the frame, the arrangement being such that the pivots of the half axles on the driving unit lie in proximity to the plane passing through the connecting means for the front end and rear end of the driving unit.

3. In a power driven vehicle, the combination of a central longitudinal girder member forming the frame and forked at one end, a driving unit, comprising an engine and transmission gearing mounted on said girder member between the prongs of the fork and swinging half axles pivoted directly on said driving unit, said swinging half axles having road wheels thereon, springing means for yieldingly connecting the half axles to the frame, elastic bearing means for securing the driving unit at its front to the prongs of the fork and similar elastic bearing means for securing the driving unit at its rear end to the prongs of the fork, the arrangement being such that the pivots of the half axles on the driving unit lie in proximity to the plane passing through the connecting means for the front end and rear end of the driving unit and the centre of gravity of the driving unit lies in proximity to said plane.

4. In a power driven vehicle, the combination of a central longitudinal girder member forming the frame and forked at one end, axle supporting means attached to said girder member between the prongs of the fork, swinging half axles having road wheels thereon pivoted on the axle supporting means, a transverse beam member attached to and connecting the prongs of the fork together, said beam member extending laterally at its ends beyond the prongs and over the half axles and resilient suspension means for the half axles interposed between the said ends of the beam member and the half axles.

5. In a power driven vehicle, the combination of a central longitudinal girder member forming the frame and forked at one end, axle supporting means attached to said girder member between the prongs of the fork, swinging half axles having road wheels thereon pivoted on the axle supporting means below the prongs of the fork and on the inner side thereof so as to extend across the prongs, a transverse beam member attached to the prongs of the fork above the latter and extending laterally at its ends beyond the prongs, said transverse beam member and half axles being located substantially one above the other, and helical springs interposed between the said ends of the transverse beam member and the swinging half axles.

6. In a power driven vehicle, a frame, a driving unit situated substantially above the wheel axis comprising engine, change speed gear and axle gear, the axle gear being arranged between the engine and change speed gear, wheels on each side of the driving unit, driven by the axle gear, half axles on which the wheels are mounted and which are pivoted directly to the driving unit substantially on both sides of the axle gear, springing means for yieldingly connecting the half axles to the frame, elastic bearing means on the engine and further elastic bearing means on the change speed gear for mounting the driving unit on the frame, whereby the said elastic connecting means are situated at least in the height of the wheel axis.

7. In a power-driven vehicle, a longitudinal central girder forming the frame situated substantially below the wheel axis and a forked portion at the rear end of the frame rising above said axis, a driving unit comprising engine, change speed gear and axle gear arranged between the prongs of the fork substantially above the wheel axis, the axle gear being arranged between the engine and change speed gear, wheels on each side of the driving unit driven by the axle gear, half axles on which the wheels are mounted and which are pivoted directly to the driving unit substantially on both sides of the axle gear, springing means for yieldingly connecting the half axles to the frame, elastic bearing means on the engine and further elastic bearing means on the axle gear for mounting the driving unit on the prongs of the fork.

8. In a power-driven vehicle, the combination of two longitudinal girder members forming a part of the frame, a driving unit comprising an engine and transmission gearing mounted between the two girder members and swinging half axles pivoted directly on said driving unit, said swinging half axles having road wheels thereon, springing means for yieldingly connecting the half axles to the frame, elastic bearing means for securing the driving unit at its front to the longitudinal girder members and similar elastic bearing means for securing the driving unit at its rear end to the longitudinal girder members, the arrangement being such that the pivots of the half axles on the driving unit lie in proximity to the plane passing through the connecting means for the front end and rear end of the driving unit.

9. In a power-driven vehicle, a frame having the main portion situated below the wheel axis, a driving unit situated substantially above the wheel axis comprising engine, change speed gear and axle gear, the axle gear being arranged between the engine and change speed gear, wheels on each side of the driving unit, driven by the axle gear, half axles on which the wheels are mounted and which are pivoted directly to the frame for the driving unit substantially on both sides of the axle gear, springing means for yieldingly connecting the half axles to the frame, elastic bearing means on the engine and elastic bearing means on the change speed gear for mounting the driving unit on the frame.

10. In a power-driven vehicle, a longitudinal central girder forming the frame situated substantially below the wheel axis and a forked portion at the end of the frame rising above said axis, a driving unit comprising engine, change speed gear and axle gear arranged between the prongs of the fork substantially above the wheel axis, the axle gear being arranged between the engine and change speed gear, wheels on each side of the driving unit driven by the axle gear and which are pivoted directly to the frame of the driving unit substantially on both sides of the axle gear, springing means for yieldingly connecting the half axles to the prongs of the fork, elastic bearing means on the engine and further bearing means on the change speed gear for mounting the driving unit on the prongs of the fork.

MAX WAGNER.